No. 680,393. Patented Aug. 13, 1901.
C. E. PARKER.
BALING PRESS.
(Application filed May 9, 1901.)
(No Model.) 2 Sheets—Sheet 1.

No. 680,393. Patented Aug. 13, 1901.
C. E. PARKER.
BALING PRESS.
(Application filed May 9, 1901.)
(No Model.)
2 Sheets—Sheet 2.

UNITED STATES PATENT OFFICE.

CHARLES E. PARKER, OF ORANGE, NEW JERSEY.

BALING-PRESS.

SPECIFICATION forming part of Letters Patent No. 680,393, dated August 13, 1901.

Application filed May 9, 1901. Serial No. 59,353. (No model.)

*To all whom it may concern:*

Be it known that I, CHARLES E. PARKER, a citizen of the United States, and a resident of Orange, New Jersey, have invented certain new and useful Improvements in Baling-Presses, of which the following is a specification.

My invention relates to presses for forming bales of fibrous material in self-binding nested layers, and has for its object the production of mechanism whereby these bales may be made with square ends.

Figure 1:
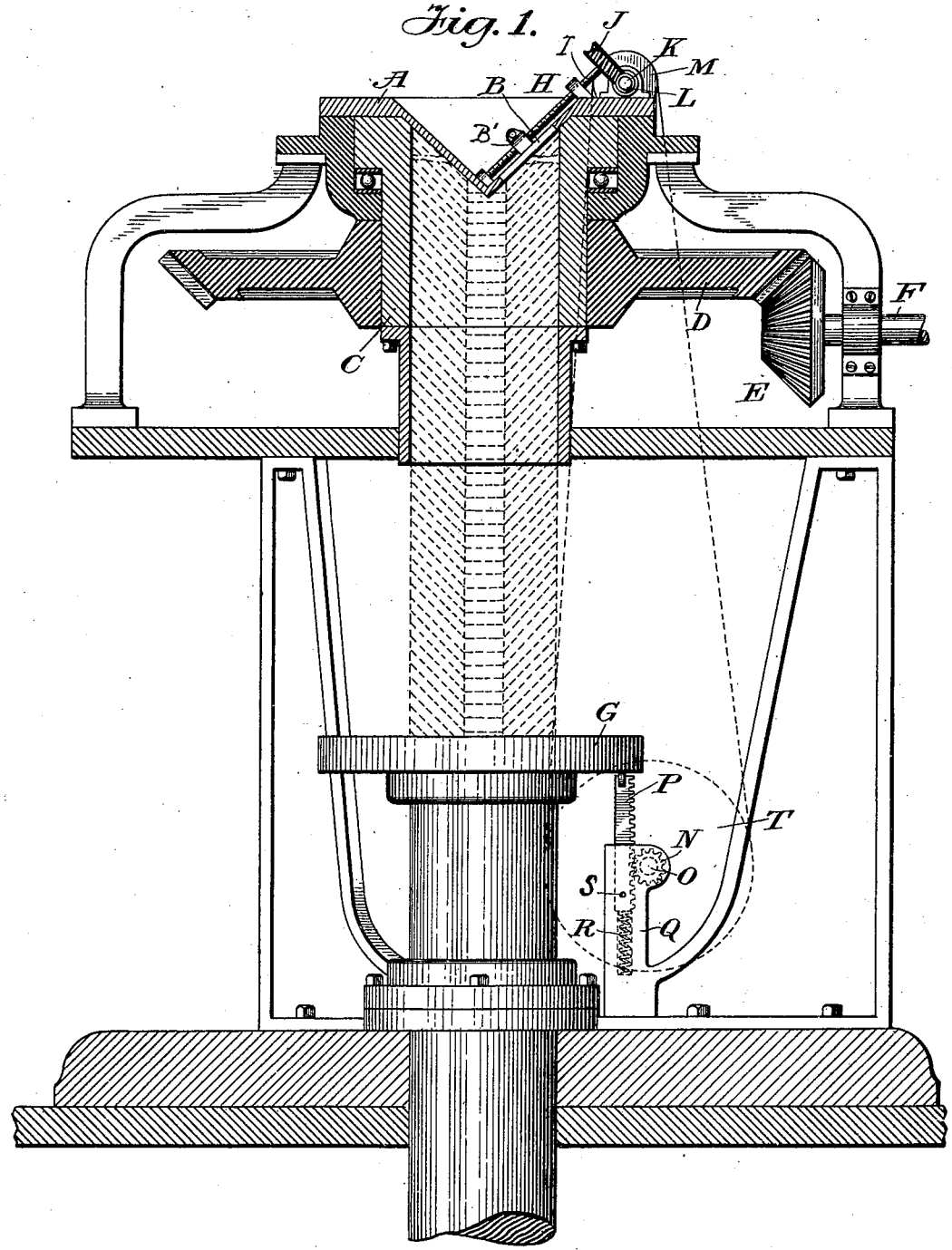
Figure 2:
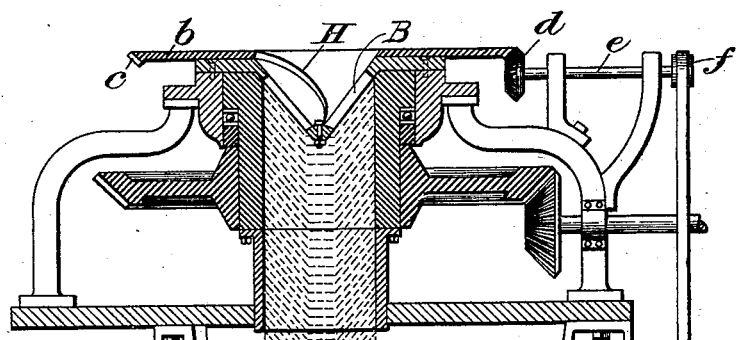
Figure 3:
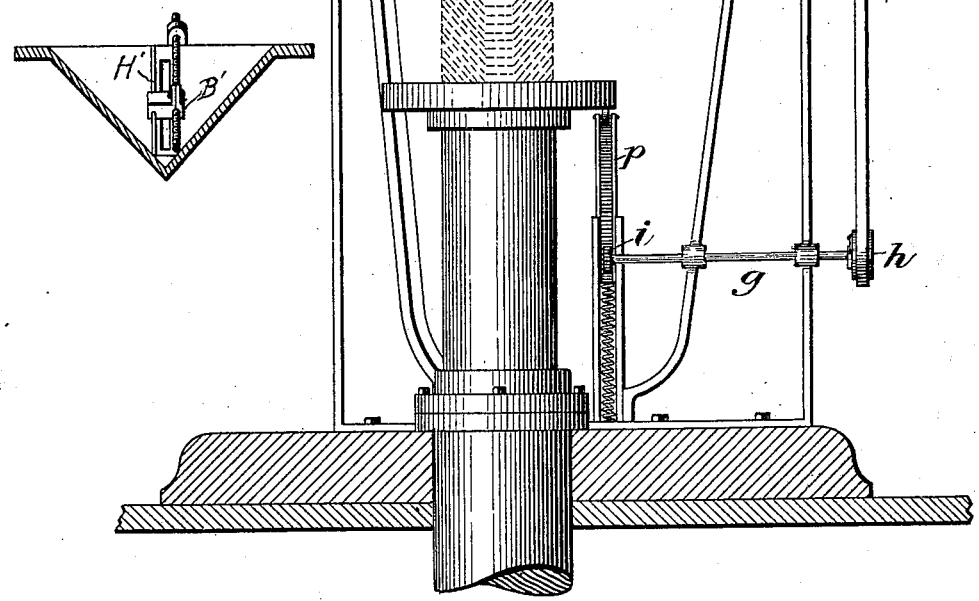

In the drawings forming part of this specification Figure 1 shows a view, partly in section, of a press equipped with one form of my invention. Fig. 2 is a view, partly in section, showing the press equipped with another form. Fig. 3 is a detail of the construction set forth in Fig. 1.

The press consists of an abutment A, which is substantially conical in form, having the slot or slots B, through which the material to be baled is fed.

C represents the receiver. It is necessary that the receiver and the abutment be rotated relatively to each other. In the present instance I have shown the receiver being rotated by means of a gear D, mounted on the receiver, and a gear E, mounted on the power-shaft F. The material being fed in through the slot and the receiver rotated, said material will be drawn in through the slot and wound in the form of a substantially conical layer conforming to the shape of the abutment, and such layer having been formed and the material still being drawn in will be wound in the form of a second layer, which will be nested in the first, forcing the first away from the working face of the abutment, and so on, forming a series of self-binding layers, as clearly indicated by the dotted lines in the figures. The bale being formed moves against a movable resistance G, which may be of any well-known or common form. This part of my invention is set forth and claimed in my application, Serial No. 54,120, filed April 3, 1901, and forms no part of the invention herein claimed.

It is obvious that by the operation above described the resultant bale will have a conical projection at one end and a conical recess at the other. To avoid this and produce a bale with substantially square ends, I provide a baffle-plate H, so constructed that it may be moved along the feeding-slot in the abutment to vary the working length of the same. The material being fed in and the baffle-plate being moved, it is evident that the width of the layer of material going into the bale will be gradually decreased, the result of which will be a square-ended bale, as clearly indicated in Fig. 1. Also if the baffle-plate be made of the proper size not only will the end of one bale be finished, having a square end, but the beginning of the next bale will be formed in the same way, as the layer of material fed in at the top of the slot gradually increases in width, forming the beginning of the next bale, while the width of the layer of material forming the finish of the old bale decreases in width, or, in other words, the baffle-plate upon being moved divides the slot into two working parts, one gradually increasing and the other gradually decreasing in length.

The form shown in Figs. 1 and 3 is a baffle-plate in the form of a sliding plate B', which moves the length of the slot and is operated by means of a screw-threaded shaft I engaging a screw-threaded orifice in the baffle-plate H, the baffle-plate being kept in proper position by a suitable guide $H^1$. (See Fig. 3.) The screw-thread may be operated by any desired means; but, as shown in the drawings, I have designed mechanism for working it automatically and at a rate which will be proportional to the feed of the bale. I attach to the screw-threaded shaft I a worm-wheel J, with which a worm-wheel K on the shaft L meshes. On the shaft L is a pulley M. At the bottom of the apparatus is a gear-wheel N, attached to a shaft O, and in engagement with said gear-wheel is a rack P, moving in suitable guides Q and normally held up by a spring R, a pin S limiting the movement of the rack. On the shaft O is a pulley T. A belt passes around the pulley T and around the pulley M, as clearly indicated. The rack is in such a position that the platen on the resistance G will strike it when the bale has attained a predetermined length. Consequently the further movement of the bale will cause the rack P to turn the shaft O and through the described mechanism move the baffle-plate. It is obvious that this mechanism may be designed so as to give any relative speed that may be desired to the baffle-plate.

In Fig. 2 I have shown a different form of baffle-plate, consisting of a spiral plate H, which is attached at one end to the apex of the abutment and at the other end to a plate *b*, resting on top of the press and adapted to turn thereon. The edges of the plate are formed with teeth *c*, which mesh with a gear-wheel *d* on a shaft *e*. This shaft also carries a pulley *f*. At the bottom of the machine is a shaft *g*, carrying a pulley *h* and a gear-wheel *i*. A belt connects the pulleys *f* and *h*. The gear-wheel *i* meshes with the rack P and is operated thereby in the same manner as heretofore described in connection with Fig. 1. The remainder of the press is constructed as heretofore described in connection with Fig. 1. It will be observed that the revolution of the plate *b* will cause the spiral plate H to gradually move across the slot in the abutment, and therefore vary the working length of the same in the same manner as heretofore described. The mechanism for moving the baffle-plate is designed to move it at a speed which will be proportional to the feed of the bale. It will be observed that many different forms of mechanism may be designed to accomplish this result. I do not wish to be limited to the two forms which I have shown, as I consider them simply illustrative of the general invention.

The shape of the abutment may be any that is desired—such, for instance, as those clearly described in my application for Letters Patent above referred to, and the abutment may be either in the inverted position, as shown, or in the protruding position, they being merely reversals. In the latter case the baffle-plate would be arranged in substantially the same manner, but on the opposite side of the abutment, and produce the same result.

What I claim, and desire to secure by Letters Patent, is—

1. In a baling-press the combination of means for forming the bale in a series of nested, self-binding layers and means for varying the width of the material being fed in, substantially as described.

2. In a baling-press a means for forming the bale in a series of nested, self-binding layers, means for varying the width of the material being fed in and connected mechanisms whereby the variation of the width of the material will be proportional with the feed of the bale, substantially as described.

3. In a baling-press a substantially conical abutment, a feeding-slot therein, a baffle-plate adapted to slide lengthwise of said slot to vary the working length thereof, and means for moving said baffle-plate, substantially as described.

CHAS. E. PARKER.

Witnesses:
A. W. GRIFFING,
A. W. GRIFFING, Jr.